US007542971B2

(12) United States Patent
Thione et al.

(10) Patent No.: US 7,542,971 B2
(45) Date of Patent: Jun. 2, 2009

(54) SYSTEMS AND METHODS FOR COLLABORATIVE NOTE-TAKING

(75) Inventors: Giovanni Lorenzo Thione, San Francisco, CA (US); Laurent Denoue, Palo Alto, CA (US); Martin Henk Van Den Berg, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 455 days.

(21) Appl. No.: 10/768,675

(22) Filed: Feb. 2, 2004

(65) Prior Publication Data

US 2005/0171926 A1    Aug. 4, 2005

(51) Int. Cl.
G06F 17/30    (2006.01)
G10L 15/00    (2006.01)
(52) U.S. Cl. .......................................... 707/6; 704/270
(58) Field of Classification Search ................ 707/1–10, 707/100–104.1, 200–205; 704/250–280
See application file for complete search history.

(56) References Cited

U.S. PATENT DOCUMENTS

| 5,655,058 | A * | 8/1997 | Balasubramanian et al. | 704/255 |
|---|---|---|---|---|
| 6,269,336 | B1 * | 7/2001 | Ladd et al. .................. | 704/270 |
| 6,434,547 | B1 * | 8/2002 | Mishelevich et al. ........... | 707/3 |
| 6,816,836 | B2 * | 11/2004 | Basu et al. ................... | 704/270 |
| 6,961,692 | B1 | 11/2005 | Polanyi et al. | |
| 6,964,023 | B2 * | 11/2005 | Maes et al. .................. | 715/811 |
| 2002/0138265 | A1 * | 9/2002 | Stevens et al. .............. | 704/251 |
| 2003/0018475 | A1 * | 1/2003 | Basu et al. ................... | 704/270 |
| 2003/0088570 | A1 | 5/2003 | Trevor et al. | |
| 2003/0197729 | A1 | 10/2003 | Denoue et al. | |
| 2004/0119762 | A1 | 6/2004 | Denoue et al. | |
| 2004/0194150 | A1 * | 9/2004 | Banker ....................... | 725/135 |
| 2004/0221237 | A1 * | 11/2004 | Foote et al. .................. | 715/700 |
| 2005/0086592 | A1 | 4/2005 | Polanyi et al. | |

(Continued)

OTHER PUBLICATIONS

Mahajan, M., Beeferman, D., Huang, X.D., "Improved Topic-dependent anguage Modeling Using Information Retrieval Techniques" in Proc. IEEE ICASSP-99, 1999.

(Continued)

Primary Examiner—Hosain T Alam
Assistant Examiner—Navneet K Ahluwalia
(74) Attorney, Agent, or Firm—Sughrue Mion, PLLC

(57) ABSTRACT

Techniques are provided for determining collaborative notes and automatically recognizing speech, handwriting and other type of information. Domain and optional actor/speaker information associated with the support information is determined. An initial automatic speech recognition model is determined based on the domain and/or actor information. The domain and/or actor/speaker language model is used to recognize text in the speech information associated with the support information. Presentation support information such as slides, speaker notes and the like are determined. The semantic overlap between the support information and the salient non-function words in the recognized text and collaborative user feedback information are used to determine relevancy scores for the recognized text. Grammaticality, well formedness, self referential integrity and other features are used to determine correctness scores. Suggested collaborative notes are displayed in the user interface based on the salient non-function words. User actions in the user interface determine feedback signals. Recognition models such as automatic speech recognition, handwriting recognition are determined based on the feedback signals and the correctness and relevance scores.

46 Claims, 10 Drawing Sheets

U.S. PATENT DOCUMENTS

2005/0144001 A1* 6/2005 Bennett et al. ............. 704/252

OTHER PUBLICATIONS

Murai, K., "Face-to-talk: Audio-Visual Speech Detection for Robust Speech Recogniztion in Noisy Environments", IEICE Trans. Fundamentals Commun. Electron. Inf. & Systems, Jan. 2002.

Plaisant, C., Mushlin, R., Snyder, A., Li, J., Heller, D., Shneiderman, B., "LifeLines: Using Visualization to Enhance Navigation and Analysis of Patient Records", HCIL Techical Report No. 98-08, University of Maryland, Oct. 1998.

Sekine, S., Sterling, J., Grishman, R., "NYU/BBN 1994 CSR Evaluation", Proceedings of the ARPA Spoken Language Technology Workshop, 1995.

Sekine, S., "Modeling topic coherence for speech recognition", Proceedings of the International Conference on Computational Linguistics (COLING) 1996, p. 913-918, Copenhagen, Denmark, 1996.

Franklin, D., Bradshaw, S., Hammond, K., "Jabberwocky: you don't have to be a rocket scientist to change sides for a hydrogen combustion lecture", Intelligent User Interfaces, 98-105, 2000.

Masui, T., Minakuchi, M., Borden, G., Kashiwagi, K., "Multiple-view approach for smooth Information retrieval" Proceedings of the ACM Symposium on User Interface Software and Technology (UIST '95) pp. 199-206, ACM Press, Nov. 1995.

Brill, E., "A simple rule-based part of speech tagger", Proceedings of the Third Annual Conference on Applied Natural Language Processing, ACL, 1992.

Kupiec, J., Kimber, D., Balasubramanian, V., "Speech-based Retrieval using Semantic Co-occurence Filtering", 1994.

Riezler, S., King, T., Kaplan, R., Crouch, R., Maxwell III, J., Johnson, M., "Parsing the Wal Street Journal using a Lexical-Functional Grammar and Discriminitive Estimation Techniques", Proceedings of the 40th Annual Conference of the Association for Computational Lingusitics, 2002.

Janin, A., "Meeting Recorder", Avios, San Jose, Apr. 2001.

Plaisant, C., Rose, A., "Exploring LifeLines to Visualize Patient Records", University of Maryland Technical Report, 1997.

Hurst, W., "Indexing, Searching, and Skimming of Multimedia Documents Containing Recorded Lectures and Live Presentations", International Multimedia Conference, Proceedings of the 11th Int. Conf. on Multimedia, pp. 450-451, Berkeley, CA USA, ACM Press 2003.

Denoue, L., Chiu, P., Fuse, T., Trevor, J., Hilbert, D., Nelson, L., Churchill, E., "Systems and Methods for Using Interaction Information to Deform Presentations of Digital Content", U.S. Appl. No. 10/672,980.

Abowd, G. and Mynatt E., "Charting Past, Present, and Future Research in Ubiquitous Computing", ACM Transactions on Computer-Human Interaction, vol. 7, No. 1, Mar. 2000, pp. 29-58.

Abowd, G., "Classroom 2000: An Experiment with the Instrumentation of a Living Educational Environment", IBM Systems Journal, vol. 38, No. 4, pp. 1999, 508-530.

Abowd, G., Atkeson, C., Brotherton, J. Enqvist, T. Gulley, P. Lemon, J., "Investigating the Capture, Integration and Access Problem of Ubiquitous Computing in an Educational Setting", in Proceedings of SIGCHI 98 Human Factors in Computing Systems, (Los Angeles, CA Apr. 1998) p. 440-447.

Abowd, G. et al., "Teaching and Learning as Multimedia Authoring: The Classroom 2000 Project", ACM Multimedia 96, Boston MA, 1996.

Bateman, A., Hewitt, J. Aladdin, A. Sivakumaran, P., "The Quest for the Last 5%: Interfaces for Correcting Real-Time Speech-Generated Subtitles", CHI 2000, Apr. 2000.

Kramer, P. "Getting the Answers" downloaded Feb. 1, 2004 from IBM Think Research Home Page at "http://www.research.ibm.com/thinkresearch/pages/2002/20020411_meetingminer.shtml".

Brown, E. Srivivasan, S. Coden, A. Ponceleon, D. Cooper, J. Amir, A. Pieper, J., "Towards Speech as a Knowledge Resource", ACM CIKM '01 Conference Proc. (Atlanta, GA Nov. 2001).

Chiu, P. Kapuskar, A, Reitmeier, S. Wilcox, L., "Notebook: Taking Notes in Meetings with Digital Video and Ink", ACM Multimedia 99 Conf. Proced. (Orlando, FL Oct. 1999).

Coden, A. Brown, E., "ACM SGIR Workshop 'Information Retrieval Techniques for Speech Applications", ACM SIGIR, Spring 2002. vol. 36, No. 1.

Cooper, J. Viswanathan, M. Kazi, Z., "SAMSA: A speech Analysis, Mining and Summary Application for Outbound Telephone Calls", in Porceedings of the 34th Hawaii International Conference on System Sciences, 2001.

Cooper, J. Coden, A. Brown, E., "Detecting Similar Documents Using Salient Terms" in Proceedings of the eleventh ACM Conference on Information and Knowledge Management (McLean, VA, Nov. 2002), pp. 245-251.

Hightower, R., Ring, L. Helfman, J. Bederson, B. Hllan, J., "Graphical Multiscale Web Histories: A Study of PadPrints", ACM Hypertext '98 Conference, (Pittsburgh, PA Jun. 1998).

Huerst, W. "Indexing, Searching, and Skimming of Multimedia Documents Containing Recorded Lectures and Live Presentations", in the eleventh ACM International Conference on Multimedia (Berkeley, CA Nov. 2003).

Kubala, F. Colbath, S. Liu, D. Makhoul, J., "Rough'n'Ready: A Meeting Recorder and Browser", ACM Computing Surveys, vol. 31, 1999.

Li, D., Simitrova, N., Li, M, Sethi, I., "Multimedia Content Processing through Cross-Modal Association", ACM MM '03 Conference Proc. (Berkeley, CA Nov. 2003).

Plaisant, C., Milash, B. Rose, A, Widoff, S. Shneiderman, B. "Lifelines: Visualizing Personal Histories", ACM Conference on Human Factors in Computing Systems: common ground CHI '96 Conf. Proc. (Vancouver, BC Apr. 1996).

Rosenfeld, R., "Adaptive Statistical Language Modeling: A Maximum Entropy Approach" Ph.D Thesis, Carnegie Mellon University, Apr. 19, 1994.

Sekine, S. , and Grisham R., "NYU Language Modeling Experiments for the 1995 CSR Evaluation" in Proced. ARPA Spoken Language Sys. Technology Workshop, 1995.

Waibel, A., Bett, M., Finke, M., Stiefelhagen, R., "Meeting Browser: Tracking and Summarizing Meetings", Proceedings of the Broadcast News Transcriptions and Understanding Workshop, p. 281-286, Morgan Kaufman, Landsdowne VA Feb. 1998.

Huerst, W., Yang, J., Waibel, H., "Interactive Repair for an Online Handwriting Interface", CHI '98, Conference on Human Factors in Computing Systems, (Los Angeles, CA 1998) pp. 353-354.

* cited by examiner

| TOKEN INFORMATION | CONFIDENCE SCORE | CORRECTNESS SCORE | RELEVANCE SCORE |
|---|---|---|---|
| This diagram on the wall is the key to our understanding | 0.80 | 0.99 | 0.99 |
| The diet on the walk is the key to hour understanding | 0.80 | 0.50 | 0.40 |
| . | . | . | . |
| . | . | . | . |
| . | . | . | . |

| SPEAKER IDENTIFIER | PRESENTATION STYLE | DESCRIPTION |
|---|---|---|
| 11 | 1 | OUTSIDE-IN |
| 13 | 2 | INSIDE-OUT |
| 25 | 2 | INSIDE-OUT |
| 30 | 1 | OUTSIDE-IN |

| SPEAKER IDENTIFIER | WRITTEN PRESENTATION STYLE | VERBAL PRESENTATION STYLE |
|---|---|---|
| 1 | EXPOSITORY1 | HEADINGS |
| 13 | EXPOSITORY2 | HEADINGS-FIRST-LEVEL |
| 25 | ISSUE-RULE-APPLICATION-CONCLUSION | CONCLUSION-ISSUE. |
| 10 | | |

SYSTEMS AND METHODS FOR COLLABORATIVE NOTE-TAKING

INCORPORATION BY REFERENCE

This Application incorporates by reference:

U.S. patent application Ser. No. 10/125,346, entitled "System and Method for Displaying Text Recommendations During Collaborative Note-Taking" by L. DENOUE et al., filed Apr. 19, 2002;

U.S. patent application Ser. No. 09/985,599, entitled "Systems and Methods for Operating a Multi-User Document Device Via a Personal Device Portal" by D. HILBERT et al., filed, Nov. 5, 2001;

U.S. patent application Ser. No. 09/630,731, entitled "A System and Method for Generating Text Summaries" by L. POLANYI et al.; each in their entirety.

BACKGROUND OF THE INVENTION

1. Field of Invention

This invention relates to collaborative note-taking, collaborative feedback, dynamic learning and dynamic adaptation based on collaborative feedback.

2. Description of Related Art

Participants in classes and seminars frequently switch the focus of their attention between note taking tasks and the task of assimilating the material presented. Class participants can be classified by their style of note-taking. In a first exemplary note-taking style, the participant concentrates on the information capture tasks to create detailed notes about the speaker's comments and the materials presented. The class participant then assimilates the notes during later review sessions. Less detailed or outline forms of the notes are typically created during these later review sessions. Since the participant is focused on the note-taking task and not on assimilating the material, the participant is less likely to pose salient questions during the class.

In a second exemplary note-taking style, the participant creates fewer and/or less detailed notes during the class. Instead, participants using this less detailed note-taking style focus their attention on dynamically assimilating the material as it is presented. Although participants using the less-detailed note-taking style may assimilate more of the material during the class, they tend to have less detailed notes available for later review.

Some meeting capture systems attempt to address these problems by capturing the speaker's speech information using automatic speech recognition. The recognized text is then presented to participants in a transcription window. This allows the participant to more quickly capture the ideas and/or details discussed during the presentation. For example, a participant may use cut-and-paste and/or other methods to quickly copy the recognized speech information into a document for later review. However, these note-assisting systems do not integrate the presentation material. Moreover, the low accuracy of the conventional automatic speech recognition used in these systems generates a large number of recognition errors. These misrecognitions reduce the value of the recognized speech information as a suggested collaborative note. In these note-taking environments, the misrecognition of a key terms increases the cognitive load of the note-taking task and misdirects the user's focus of attention to correcting the recognition errors in the recognized textual information. Infrequently used words and phrases that lie outside the vocabulary of the general language models used by these conventional automatic speech recognition systems also create errors in the recognized textual information that disrupt the note-taking task.

SUMMARY OF THE INVENTION

Systems and methods that dynamically determine language models based on domain indicators in speech would therefore be useful. Systems and methods that dynamically determine recognition models such as language models based on domain indicators in the signal and/or based on external domain indicators would also be useful.

BRIEF DESCRIPTION OF THE DRAWINGS

FIG. 6 shows an exemplary data structure for storing candidate salient token information according to one aspect of this invention;

FIG. 9 is a first exemplary data structure for storing presentation style information according to one aspect of this invention;

FIG. 10 is a second exemplary data structure for storing presentation style information according to another aspect of this invention;

DETAILED DESCRIPTION OF EXEMPLARY EMBODIMENTS

Figure 1:
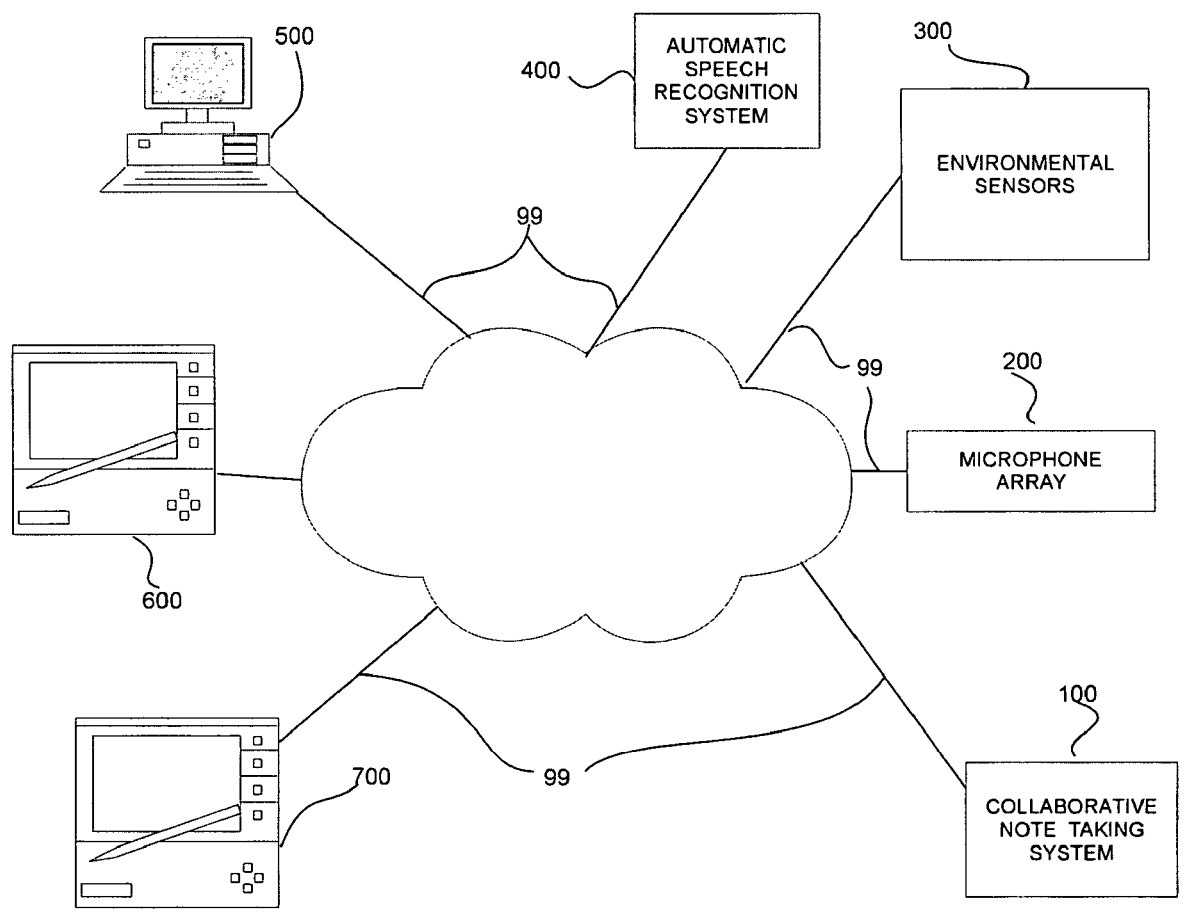
FIG. 1 is an overview of the use of an exemplary collaborative note-taking system according to this invention.

FIG. 1 is an overview of the use of an exemplary collaborative note-taking system 100 according to this invention. The microphone array 200; the environmental sensors 300; the automatic speech recognition system 400; a personal computer 500; a first tablet personal computer 600 and a second tablet personal computer 700 are all connected via communications link 99 to the collaborative note-taking system 100.

In one of the various exemplary embodiments according to this invention, the speaker presenting the class is identified. The speaker identifier may include but is not limited to the speaker's name, the speaker's employee number, or any other information capable of uniquely identifying the speaker and the speech information to the collaborative note-taking system. The speaker identifier is then used to optionally determine a speaker based language model for the automatic speech recognition system 400. The speaker based language model is used to compensate for idiosyncratic speech characteristics such as the accent of the speaker, prosody, intonation and the like.

The domain or subject matter of the class is then determined. The domain information may be determined by entering the subject matter of the class into a dialog box or other user interface input component. In various other exemplary embodiments, the domain information is based on the topic keywords or other salient tokens in the speech information. In still other exemplary embodiments according to this invention, external information such as speaking notes, presentation slides, class schedules, location sensors and the like may be used to determine and/or infer the domain information.

Thus, in one of the exemplary embodiments, machine readable copies of the presentation slides and/or the speaker's notes are used to determine the domain information. Once the domain information is determined, a domain based language model is determined. The speaker language model and/or the domain language model are then optionally combined to determine a composite speaker-domain based language model. Since the composite speaker-domain based language model is specific to both the speech characteristics of the speaker and the domain vocabulary of the class, the composite speaker-domain based language model is useful in identifying salient speech information and creating collaborative notes.

In one example according to this invention, the identification of a speaker "Jim Smith" is used to select a speaker based language model suited to recognizing speech utterances in "Jim Smith's" pronounced accent. The speaker identification may also be used to infer an initial domain based on the speaker's resume, research interests, previous presentations and the like. The inferred domain information is then used to determine a domain based language model. It will be apparent that the domain is typically determined dynamically. Thus, subsequent domain information can be used to determine additional adjustments and/or new domain based language models.

After the speaker and/or domain based language models have been determined. The salient tokens in the speech information are determined based on a threshold salience model. The threshold salience model identifies non function words in the speech information. In various exemplary embodiments according to this invention, the salience model determines non-function words based on word frequency, presence of acronyms, expansions of acronyms, data, numbers, figures, grammaticality, well formedness, parts-of-speech, adjectives, verbs, nouns or any known or later developed measure of informativity.

Information contained in the presentation slides and/or the speaker's notes is then determined. The relevancy and correctness of the salient tokens are then determined. In various exemplary embodiments according to this invention, the relevance information is determined based on the relatedness of the salient tokens to the accompanying presentation slides, speaker's notes and the like. Thus, in one embodiment, several candidate phrases are determined for each unit of recognized speech. Linguistic analysis of the candidate tokens is performed using the tools of the Xerox Linguistic Environment, the Unified Linguistic Discourse Model of Livia Polanyi et al., or any other known or later developed linguistic tool. The Unified Linguistic Discourse Model is further discussed in co-assigned, co-pending U.S. patent application Ser. No. 10/684,508, attorney docket FX/A3010-317006, herein incorporated by reference in its entirety. The linguistic tools are used to provide metrics to rank the candidate tokens based on syntactic, semantic and/or lexical consistency. The candidate tokens that are found in the presentation slides, speaker's notes or other support material are inferred to be more relevant. The overlapping candidate tokens are therefore associated with a higher relevance score.

Thus, if portions of the candidate salient tokens are present in a current presentation slide, the current speaker's notes, or other support material, then the token is considered more relevant to the note-taking task and the is ranked higher. A correctness score is also determined for each salient token. In one of the various exemplary embodiments according to this invention, a correctness score is determined based on the collaborative user feedback information. For example, the selection of candidate salient tokens by a large group of users may be used to infer the correctness of the salient tokens. Conversely, changes to the candidate salient tokens, large groups of users ignoring the candidate salient tokens and/or other actions may be used to infer that the salient tokens are less correct. Thus, in one of the exemplary embodiments according to this invention, the negative collaborative feedback signals are used to adjust the salient token correctness score lower.

In various other exemplary embodiments according to this invention, different presentation styles are determined for the speaker, the meeting genre, the subject matter presented or any other category. The presentation style is a predictive model that indicates how a speaker will verbally present different types of information. The corresponding presentation style associated with the speaker's written presentation is also determined. A predictive model is then determined that predicts the speaker's verbal presentation style based on the speaker's written presentation style.

For example, in one of the various exemplary embodiments according to this invention, a training corpus of written presentations by a speaker are analyzed based on theory of discourse analysis. Structural representations of discourse are then determined for the written presentations. The structural representations of discourse are clustered and exemplary structural representations of written discourse determined. The speech information accompanying each written presentation is determined and exemplary structural representations of verbal discourse are similarly determined. Comparisons of the written and verbal structural representations of discourse are used to infer the speaker's exemplary style of presentation for different domains, genres, languages and/or other known or later developed categories of presentation information.

Thus, in one example, a first speaker is associated with an inside out presentation style. An inside out presentation style begins the presentation by explaining more detailed points first and then building or assembling the rhetorical arguments into larger groupings. In contrast, a second speaker may be associated with an outside-in presentation style. An outside-in presentation style tends to focus on larger points first and then finds support for these points with progressively more detailed information.

Thus, by comparing the current presentation style to the presentation material, the likely relevant portion of the presentation information is dynamically determined. The determination of likely relevant portions of the presentation information provides a basis to which salient tokens in the speech information can be compared. The relevancy of the salient tokens and shifts in the domain are then determined by comparing the salient tokens to the words in the relevant portions of the presentation information. Adjustments to the domain are then used to adjust and/or select the domain based language models for automatic speech recognition. It will be apparent that the invention may be used to adaptively improve any recognition task based on temporally associated contextual information.

Collaborative notes are then determined and displayed to the users of personal computer 500, a first tablet personal computer 600 and a second tablet personal computer 700 within a collaborative note-taking user interface. The collaborative note-taking user interface monitors actions of the users within the collaborative note-taking user interface. The monitored actions are used to determine a collaborative user feedback signal. Adjustments to the domain based language models are then determined based on the collaborative user feedback signal. It will be apparent that the monitoring of user actions within the collaborative user interface is only exemplary and that user gestures captured on video, user audio indicators or any other user action may be also used to generate user feedback signals in the practice of this invention.

In various exemplary embodiments according to this invention, the collaborative note-taking user interface maintains a presentation view of the presentation slides or other presentation information. The presentation view is synchronized to the portion of the presentation currently described by the speech information. The synchronization may be based on determinations of maximal relevance between the presentation notes and the speech information or any known or later developed metric. If a user or a group of users determines that the presentation view does not contain the desired view of the presentation information, the user or group of users can change the view to display other presentation information. In still other exemplary embodiments according to this invention, any changes to the synchronized view are used to adjust the predictive model of presentation styles for the speaker.

Figure 2:
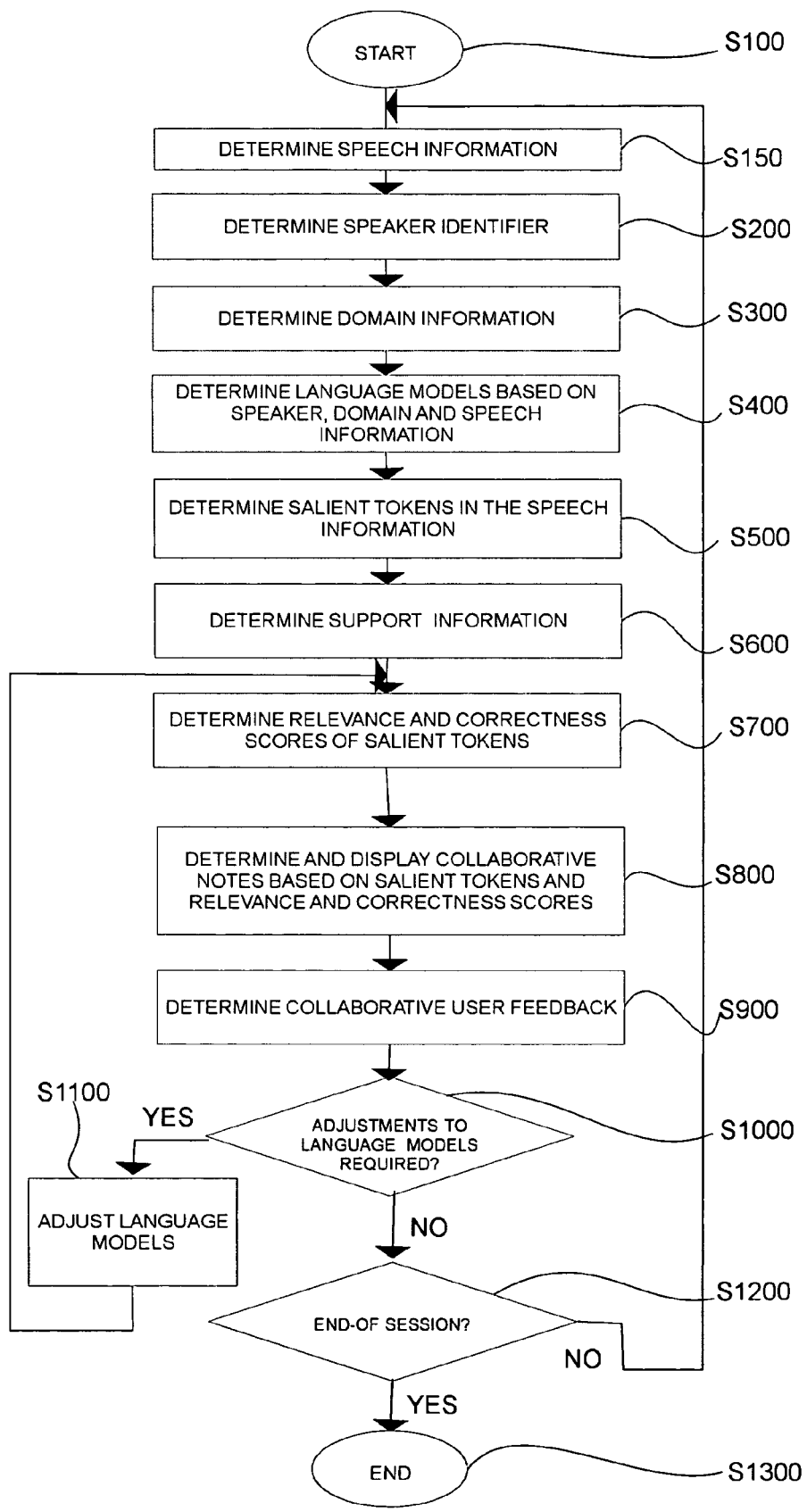
FIG. 2 shows an exemplary method of collaborative note-taking according to this invention.

FIG. 2 shows an exemplary method of collaborative note-taking according to this invention. The process begins at step S100 and then immediately continues to optional step S150. In step S150, the speech information is determined. The speech information may be determined from an automatic speech recognition system or the like. Control then continues to optional step S200.

In step S200, the speaker identifier information is optionally determined. The speaker identifier information may include but is not limited to the name of the speaker giving the class, an identification number assigned to the speaker or any other identifier that associates a source of speech information with a speaker. Thus, a code associated with a wireless classroom microphone allows the speech information for the speaker using the wireless classroom microphone to be easily identified. However, it should be apparent that any method of identifying speaker information may also be used in the practice of this invention. After the speaker identifier information has been determined, control continues to optional step S300.

The domain information associated with the class or seminar is determined in step S300. The domain information may be determined based on the explicit entry of domain information by the speaker or may be inferred. Thus, in various exemplary embodiments according to this invention, the domain information is determined based on class schedules, meeting agendas or any other source of implicit or explicit domain information. In still other exemplary embodiments according to this invention, the domain information is determined based on salient information in the initial speech information. For example, the phrase, "Thank you for attending this lecture describing recent advances in proteomics", explicitly indicates the domain of the discussion. After the domain information has been determined, control continues to step S400.

In step S400, the language models are determined based on the optional speaker information and/or domain information. The speaker based language model is then combined with the domain based language model into a composite speaker-domain based language model. The use of speaker identifier information allows the selection of language models based on the specific language and/or usage patterns of the speaker. The domain based language model allows the system to dynamically increase responsiveness to the type of words likely to occur in the identified domain. After the language models have been determined, control continues to step S500.

The salient tokens are determined based on the informativity of the words in the speech information in step S500. For example, in one of the exemplary embodiments according to this invention, the non-function words in the speech information are identified. The informativity of each of the non-function words is then determined based on informativity metrics. Informativity metrics may include, but are not limited to word frequency and the like. In various exemplary embodiments according to this invention, the presence of acronyms, expansions, data, numbers and figures, grammaticality and/or well formedness of the speech information may also be used as an informativity metric. In still other exemplary embodiments according to this invention, the classification of non-function words based on parts-of-speech such as adjectives, verbs and nouns and/or references to presentation support information is used to determine the salient tokens. However, it will be apparent that any known or later developed method of determining salient tokens in the speech information may be used, alone or in combination in the practice of this invention. After the salient tokens in the speech information have been determined, control continues to step of S600.

In step S600 the support information is determined. The support information may include information extracted from presentation slides, information from the speaker's notes or any other information source useful in identifying domain or topic information. After the support information has been determined, control continues to step S700.

The relevance and correctness information for the salient tokens in the speech information is determined in step S700. The relevance information may be determined based on the relatedness of the speech information to the presentation information. For example, in one of the exemplary embodiments according to this invention, classes of the WordNet® lexicon are used to provide an indication of the sematic relatedness between the salient tokens in the speech information and the words present in relevant portions of a presentation slide. After the relevance and correctness information has been determined, control then continues to step S800.

In step S800, collaborative notes are determined and displayed based on the salient tokens in the speech information, the support information, the relevance information and the correctness information. For example, in one of the various exemplary embodiments according to this invention, suggested collaborative notes are determined based on salient tokens in the speech information and the presentation information. That is, the suggested collaborative notes may include but are not limited to, the salient tokens and/or portions of the presentation information.

Portions of the collaborative notes are optionally highlighted with human sensible display attributes to indicate their relevance. The tokens of speech information that overlap conceptually or literally with words in the presentation information are optionally highlighted bolded, set in italic, displayed in varying colors, displayed with a blinking attribute or using any other known or later developed human sensible display attribute. It will be apparent that arrows, pointers or any other method of directing the user attention may also be used without departing from the scope of this invention.

In still other exemplary embodiments according to this invention, the human sensible display attributes are dynamically determined based on any combination of one or more of the confidence score, the correctness score, the relevance score, user interest and the like. Thus, more relevant and/or interesting material is optionally displayed in varying colors, fonts, sizes and/or using any other human sensible display attribute likely to attract a user's attention and facilitate selection. Moreover, measures of relevance, correctness, confidence and the like are also optionally used to dynamically determine the size of a hotspot or other user interface selection element useable to select the desired information. For example, if information is displayed to a collaborative user on the small display of personal digital assistant or the like, optional dynamic zooming of the information for a transient selection period fills the small display with the information. This facilitates user selection of the information. After the transient selection period, the information is displayed at normal size. After the collaborative notes are determined and displayed, control continues to step S900.

The collaborative user feedback information is then determined in step S900. The collaborative user feedback information may include explicit and/or implicit feedback. For example, the explicit collaborative user feedback may include, but is not limited to the selection of a portion of a suggested collaborative note by a collaborative user. In various other exemplary embodiments according to this invention, collaborative users may select groups of trusted and/or exemplary note takers. The collaborative feedback information associated with the trusted and/or exemplary note takers is then given higher weight when ranking the information within the collaborative user interface. In still other exemplary embodiments according to this invention, the collaborative user feedback information is weighted based on the actions of the majority of the users. However, it should be apparent that any known or later developed weighting of the collaborative user feedback information may be used without departing from the scope of this invention. After the collaborative user feedback information has been determined, control continues to step S1000.

In step S1000, a determination is made as to whether the collaborative user feedback information requires any adjustment of the language models. If it is determined that an adjustment of the language models is necessary, control continues to step S1100. In step S1100, the language models are adjusted and control jumps immediately to step S700. The steps S700-S1100 are then repeated until a determination is made in step S1000 that additional adjustments to the language models are not required. When no further adjustments to the language models are required, control continues to step S1200 where a determination is made as to whether an end-of-session has been requested.

The end-of-session may be requested by selecting a drop down dialog box, a voice command or any other known or later developed method of indicating an end-of-session. If it is determined that an end-of-session has not been requested, control jumps immediately to step SI 50. Steps S150-S1100 are then repeated until it is determined in step S1200 that the user has requested an end-of-session. When it is determined that an end-of-session has been requested, control continues to step S1300 and the process ends.

Figure 3:
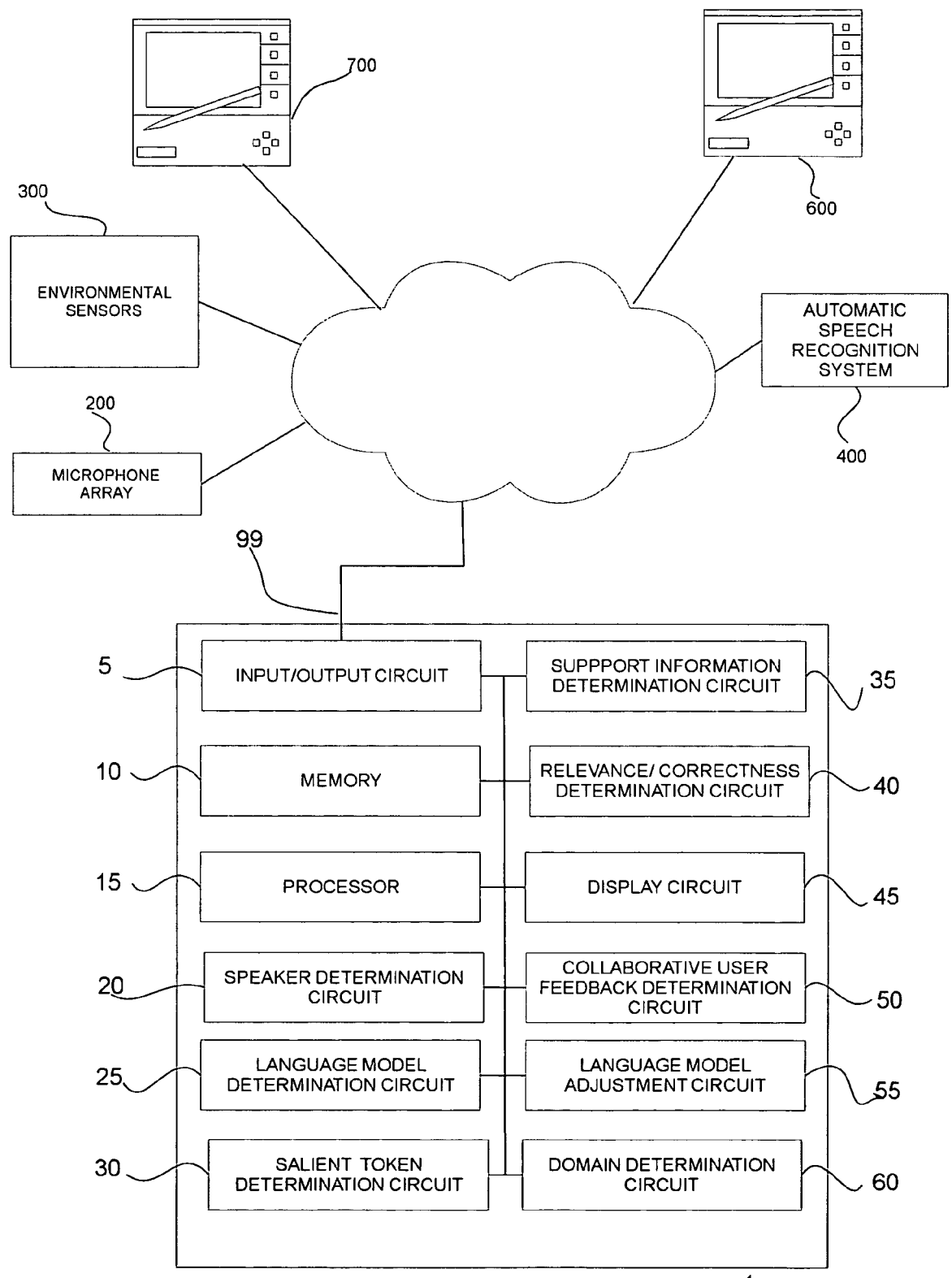
FIG. 3 shows an exemplary collaborative note-taking system according to one aspect of this invention.

FIG. 3 shows an exemplary collaborative note-taking system 100 according to one aspect of this invention. The collaborative note-taking system 100 comprises: a memory 10; a processor 15; a speaker determination circuit 20; a language model determination circuit 25; a salient token determination circuit 30; a support information determination circuit 35; a relevance score/correctness determination circuit 40; a display circuit 45; a collaborative user feedback determination circuit 50; a language model adjustment circuit 55; and a domain determination circuit 60, each connected to an input/output circuit 5. The input/output circuit 5 is connected via the communications link 99 to a first tablet personal computer 600; a second tablet personal computer 700; a microphone array 200; an environmental sensor array 300; an automatic speech recognition system 400 and a collaborative note-taking system 100.

During a class or seminar, the speech information is captured by the microphone array 200. The microphone array may use speech processing methods to identify the speaker. However, it should be apparent that a lavaliere microphone, a tagged wireless microphone, a radio frequency identification tagged microphone or any other type of microphone useful in identifying the speaker to the automatic speech recognition system may also be used in the practice of this invention. The automatic speech recognition system recognizes the speech information and forwards the optionally speaker identified speech information via the communications link 99 to the collaborative note-taking system 100.

The processor 15 activates the input/output circuit 5 to receive the optionally speaker identified speech information from the automatic speech recognition system 400. The speaker determination circuit 20 is then activated to determine the speaker associated with the speech information. In one of the various exemplary embodiments according to this invention, each speaker is explicitly identified to the system by a registration process. In other exemplary embodiments according to this invention, implicit speaker identification is based on the recognition of voice characteristics associated with a speaker, a tagged microphone, video identification, an RFID tag and/or any known or later developed method of determining the source of the speech information.

The processor 15 then activates the domain determination circuit 60 to determine the domain or topic associated with the speech information. The domain information may be determined based on explicit and/or implicit indicators. For example the title information from a speaker registration system, a class schedule, or any known or later developed information source can be used to explicitly identify the domain of the class discussion. In various other exemplary embodiments according to this invention, a classroom schedule is used to determine the domain of the class. The domain information may also be determined implicitly based on introductory remarks made by the speaker. For example, the phrase "Today we will be discussing topic A", or the phrase "Welcome to our class on topic B",both form recognizable discourse structures. The informative non-function words in the recognizable discourse structures are used to determine the discussion domain for the class.

The domain information is used to automatically determine the relevant context of the speech information. That is, specific domain based language models are selected and/or adjusted based on dynamic determinations of the domain. The dynamic domain determinations may be based on speech information and/or optionally grounded to external indicators such as presentation slides, the class setting, explicit entry of domain information and the like. The domain based language models more accurately identify salient tokens in the speech information useful in determining collaborative notes for the domain.

The processor 15 then activates the language model determination circuit 25. The language model determination circuit 25 determines the language models to be used by the automatic speech recognition system 400. In one of the various exemplary embodiments according to this invention, speaker based and domain based language models are combined into a composite speaker-domain based language model. However, and as discussed above, it will be apparent that the speaker and the domain language models may also be applied to the speech information either individually or separately without departing from the scope of this invention.

The salient token determination circuit 30 is then activated to determine the salient tokens in the speech information. In various exemplary embodiments, the salient tokens in the speech information are determined based on the non-function words. The more informative non-function words are selected as the salient tokens. The informativity of non-function words may be determined based on metrics of informativity such as parts-of speech and the like.

The support information determination circuit 35 is then activated to determine the presentation support information contextually and temporally related to the speech information. For example, many presentations are guided by visual aids such as talking points on a presentation slide, a speaker's notes and the like. In one of the exemplary embodiments according to this invention, the presentation support information determination circuit 35 uses a predictive model of presentation style retrieved from memory 10 to determine portions of the presentation support information that form the basis for the speaker's current speaking point. The salient tokens in the associated speech information are then compared to the predicted portions of the presentation support information. The number and/or type of words and/or concepts shared by the presentation support information and the speech information is used to determine the relevance of the current domain to the speech information.

The relevance/correctness determination circuit 40 is then activated to determine the relevance and correctness of the speech tokens. That is, the relevance information may be used to indicate that a first set of candidate tokens are more relevant than a second set of tokens based on the degree of literal and/or conceptual overlap with the presentation information or other external indicators. In various other exemplary embodiments according to this invention, the environmental sensors may be used to determine explicit and/or implicit indicators of speaker identification, domain information and/or monitored collaborative user feedback information.

The correctness information determined by the relevance/correctness circuit indicates the probability that a candidate token is correct. In one of the exemplary embodiments, the correctness is indicated based on environmental sensors. The environmental sensors may include but are not limited to sensors that monitor the collaborative user feedback information. The collaborative user feedback sensors determine user actions with respect to the speech information, the suggested collaborative note, a portion of the presentation or any other element of the collaborative note-taking user interface. It will be apparent that the environmental sensors may be used to determine positive or negative collaborative user feedback signals. For example, in one exemplary embodiment, a negative collaborative user feedback signal is generated based on user corrections or revisions to the suggested collaborative note and/or salient tokens. The collaborative user feedback signal is then used to adjust the correctness value associated with the salient token. The collaborative user feedback sensors may perform gesture recognition, monitor user posture, facial expressions or any other feature or action useful in determining correctness.

The processor 15 then activates the display circuit 45 to determine and display the suggested collaborative notes based on the salient tokens, the speech information and the support information to the users of the first tablet personal computer 600 and a second tablet personal computer 700. In various exemplary embodiments according to this invention, the speech information, the support information, and/or the collaborative notes are further transformed by applying grammatical, hybrid and/or keyword summary generators, video scene recognition and/or any other transformation.

The collaborative user feedback determination circuit 50 is then activated to determine the collaborative user feedback responses with respect to the salient tokens and/or the elements of the suggested collaborative note displayed in the collaborative note-taking user interface. The language model adjustment circuit 55 is activated to determine required adjustments to the speaker and/or domain based language models. Adjustments to the speaker and/or domain based language models are based on the determined changes in the domain, the collaborative user feedback signals, the environmental sensors, and/or the support information, either alone or in combination.

Figure 4:
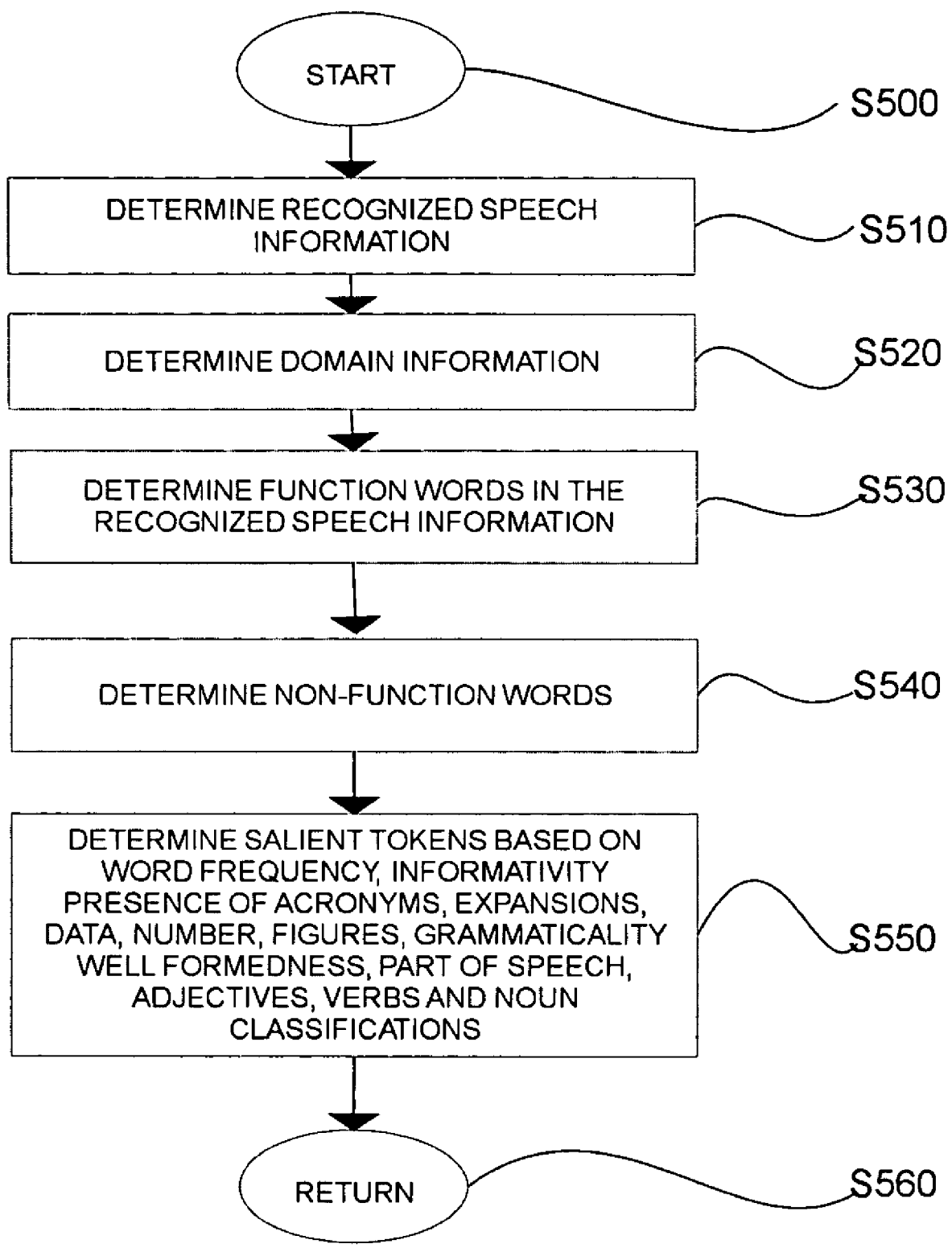
FIG. 4 is an exemplary method of determining salient tokens according to one aspect of this invention.

FIG. 4 is an exemplary method of determining salient tokens according to one aspect of this invention. Control begins at step S500 and immediately continues to step S510. In step S510 the speech information is determined. In various exemplary embodiments according to this invention, the speech information is recognized by an automatic speech recognition system. In still other exemplary embodiments according to this invention, the automatic speech recognition system may be embedded within the collaborative note-taking system. After the recognized speech information has been determined, control continues to step S520.

In step S520, the domain information associated with the speech information is determined. Typically, the domain information has been previously determined and saved into a memory from which the information is retrieved in step S520. However, the domain information may also be dynamically determined based on explicit indications from the user, implicit information derived from the speech information or based on any other method in step S520. After the domain information has been determined, control continues to step S530.

In step S530, function words are determined. Function words are the less informative and less domain specific words contained within a phrase or sentence. Moreover, function words are words that can be omitted without significantly affecting the informativity of the resultant phrase or sentence. After the function words have been determined, control continues to step S540.

In step S540, non-function words are determined. In various exemplary embodiments according to this invention, non-function words are determined by removing the function words from the words in a sentence or phrase. The resultant set of words and/or phrases are higher informativity non-function words. After the non-function words have been determined, control continues to step S550.

In step S550, candidate salient tokens are determined based on additional metrics of informativity. The metrics of informativity may include but are not limited to word frequency and the presence of acronyms. The presence of no-functions words within acronym expansions, and/or the presence of data, numbers and figures within candidate salient tokens can also be used to infer and/or determine their saliency. Parts-of-speech classifications, grammaticality, well-formedness and/or any other informativity indicator may also be used to determine the salient tokens. In one of the various exemplary embodiments according to this invention, adjectives in the recognized speech information are likely to refer to the support material. Similarly, acronyms such as "DNA", specific data such as numbers and/or references to figures are also likely to be more informative. Expansions of acronyms are also likely to be informative with respect to the domain and/or topic of the presentation. After the informativity of the candidate tokens has been determined, control continues to step S560. Control is then immediately returned to step S600 of FIG. 2.

Figure 5:
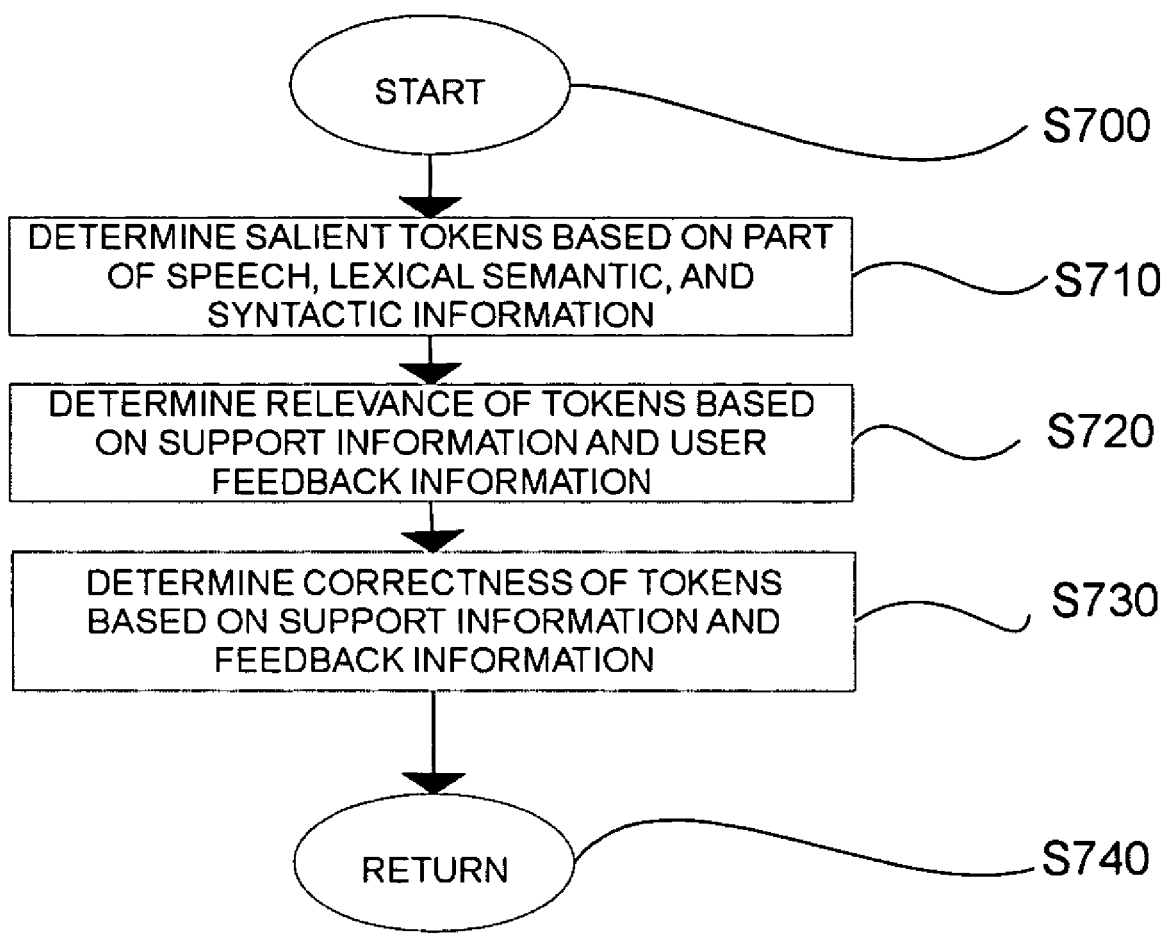
FIG. 5 is an exemplary method of determining the relevance and correctness of speech information according to one aspect of this invention.

FIG. 5 is an exemplary method of determining the relevance and correctness of speech information according to one aspect of this invention. The process begins at step S700 and immediately continues to step S710.

In step S710, the candidate tokens are determined based on the lexical, sematic and syntactic information. For example, in various exemplary embodiments according to this invention, a part-of-speech tagger, a lexical parser and/or any known or later developed linguistic tool useful in determining the importance of a word and/or a phrase is used to determine the important tokens. After the tokens have been determined, control continues to step S710.

In step S710, parts-of speech, syntactic, lexical and semantic information is used to determine the salient tokens in the speech. For example, parts-of-speech identified as modifiers are likely to be relevant to the domain. Similarly, references to the presentation support information also provide a link to a known basis for determining domain relevancy. After the salient tokens are determined, control continues to step S720.

Information coming from information slides and/or any other contextually related and temporally synchronized channel of support information, including collaborative user activity is used to estimate the relevance score of the salient tokens in step 720. A speech utterance is likely to generate various alternate recognized phrases. Relevance scores are therefore determined for each of the multiple phrases based on a variety of relatedness metrics including but not limited to literal and/or semantic overlap with external temporally synchronized information, collaborative user activity information or any other known or later developed external information useful in determining domain relevance.

Additional alternate phrases associated with the speech utterance are also assigned relevance scores. Alternate phrases having greater conceptual or literal relatedness to the presentation information are assigned higher relevance scores. In various other exemplary embodiments according to this invention, the collaborative user feedback signals may also be used to adjust the relevance score. Positive collaborative user feedback signals such as selection and/or transformation of tokens, selection of suggested notes and the like are used to reinforce the relevancy determinations. Similarly, negative collaborative user feedback signals may also be used to retrain the predictive models. Thus, alternate phrases that are more frequently selected are assigned higher relevance scores. After the relevance scores for the phrases are determined, control continues to step S730.

In step S730, correctness scores for the tokens are determined based on the presentation and feedback information. For example, correctness scores associated with a token may be increased based on collaborative user feedback information indicating that a significant number of collaborative users have added the salient tokens to their private notes. The well formedness of a token may also be used as an indicator of correctness. The grammaticality of the token and referential consistency with respect to prior tokens already adopted by the users can also be used to adjust the correctness score. Thus, metrics based on processing by the Xerox Linguistic Environment (XLE), features identified by the Unified Linguistic Discourse Model or any other set of linguistics tools may be used to determine measures of correctness. It should be noted that although linguistic measures of correctness are described in one of the exemplary embodiments, any metric of salient token correctness may also be used in the practice of this invention. After the token's correctness scores have been determined, control continues to step S740 and then returns immediately to step S800 of FIG. 2.

FIG. 6 shows an exemplary data structure for storing candidate salient token information 800 according to one aspect of this invention. The exemplary data structure for storing candidate salient token information 800 is comprised of a token information portion 810; a confidence score portion 820; a correctness score portion 830; and a relevance score portion 840.

The first row of the exemplary data structure for storing candidate tokens 800 contains the value, "This diagram on the wall is the key to our understanding" in the token information portion 810. The token information reflects the likely content associated with a speech utterance. The token information is optionally displayed within the collaborative note-taking user interface as part or all of a collaborative note.

The confidence score 820 contains the value "0.80". The value "0.80" indicates an estimate of confidence that the value in the token information portion 810 accurately represents the speech utterances. The confidence portion 820 may be obtained from an automatic speech recognition system or may be determined directly by the collaborative note-taking system 100.

The correctness score portion 830 contains the value "0.99". This "0.99" value in the correctness score portion 830 indicates the likelihood that the specified tokens correctly reflect the speech information. In various exemplary embodiments according to this invention, the value of the correctness score is determined based on linguistic parsing tools such as the tools provided in the Xerox Linguistic Environment (XLE) and/or measures of discourse consistency as provided by the Linguistic Discourse Model, discussed above. However, it will be apparent that any method of determining a correctness score may be used in the practice of this invention. Thus, in still other embodiments according to this invention, the collaborative user feedback signals are used to determine correctness scores based on voting metrics and the like. Alternatively, the value in the correctness score portion 830 is determined based on the similarity between the relevant portion of the presentation support information and the speech information. In still other exemplary embodiments, the well formedness of the token or phrase is also used to provide an implicit indication of the correctness of the token information.

The relevance score portion 840 contains the value "0.99". The value "0.99" indicates that the token information is highly relevant. In one of the various exemplary embodiments according to this invention, the value in the relevance score portion 840 is based on a metric of the similarity between the token information and the presentation information. In still other exemplary embodiments according to this invention, similarity metrics are determined based on the degree of semantic relatedness between the token information and the presentation information.

The second row of the exemplary data structure for storing candidate salient token information contains the value, "The diet on the walk is the key to hour understanding" in the token information portion 810. This value reflects a second or alternate generated phrase or sentence.

The confidence portion 820 contains the value "0.80" indicating the confidence in the token information. As discussed above, the confidence information may be determined from confidence information provided by the speech recognition system or may be determined directly by the collaborative note-taking system.

The correctness portion 830 contains the value "0.50". This value indicates the likely correctness of the token information. In various exemplary embodiments according to this invention, semantic, syntactic and/or other measures of consistency between the Unified Linguistic Discourse Model, The Xerox Linguistic Environment and/or any other system of linguistic analysis, may be used as measures of correctness. For example, grammatical and/or well formed sentences are more likely to be correct semantically. In other exemplary embodiments according to this invention, the linguistic continuity with respect to previously determined and/or adopted tokens may be used as a metric of the tokens correctness. In this case, the phrase "on the walk" is unlikely to correctly refer to the phrase "the diet". Similarly, the phrase "hour understanding" is difficult to relate to either the phrase "the diet" or the phrase "on the walk". Thus, the linguistic based metric of correctness for the phrase is low and the correctness value for such malformed candidate tokens is therefore also low. In this case, the "0.50" value indicates that the tokens are unlikely to correctly represent the speech information.

The relevance score portion 840 contains the value "0.40". This value indicates the degree of overlap between the presentation information and the token information. The "0.40" value indicates little conceptual overlap between the two sources of information. Therefore, in a collaborative note-taking environment, the information in the token information portion 810 is likely to be considered relevant.

Figure 7:
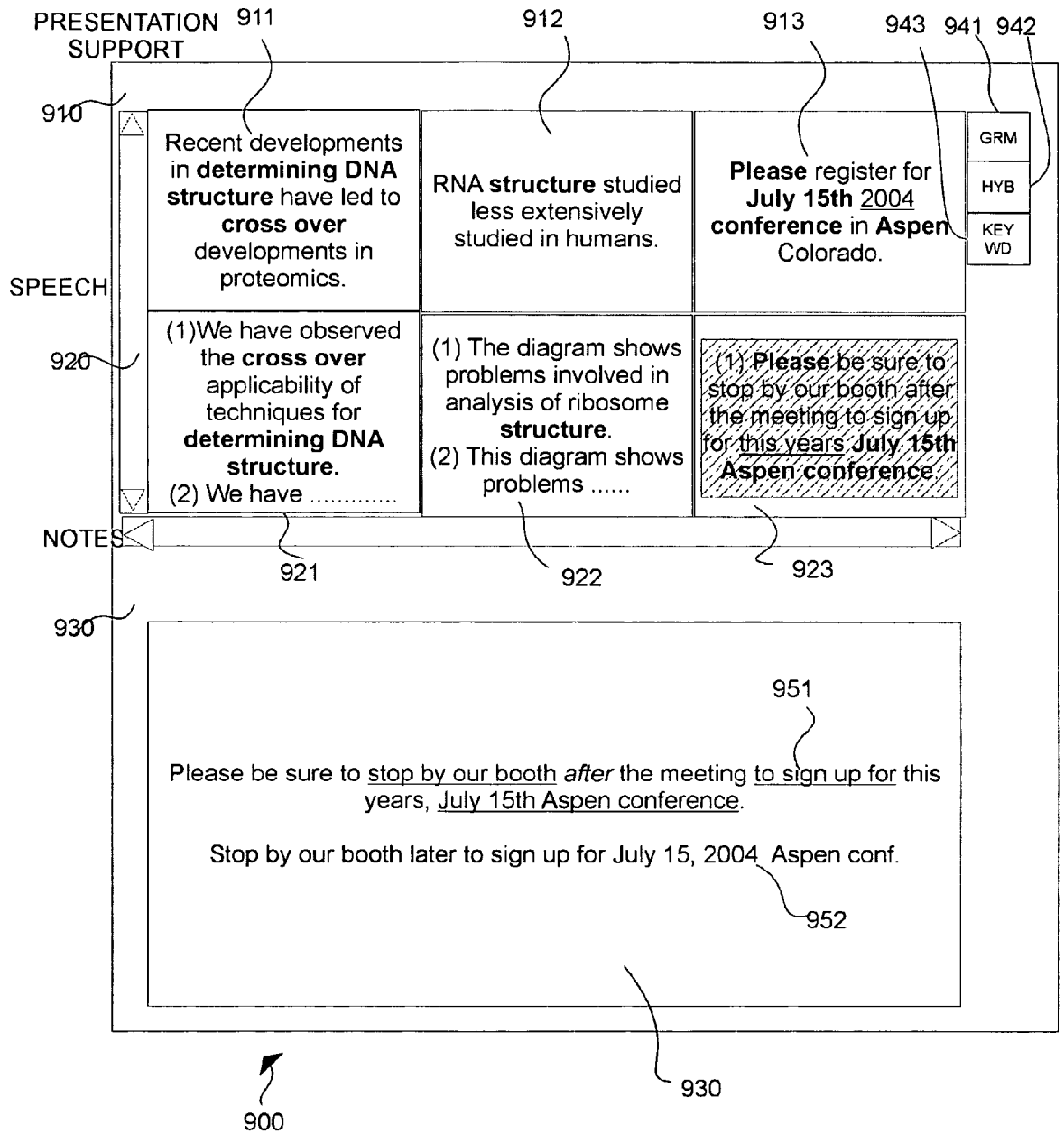
FIG. 7 shows an exemplary collaborative note-taking user interface according to one aspect of this invention.

FIG. 7 shows an exemplary collaborative note-taking user interface 900 according to one aspect of this invention. The exemplary collaborative note-taking user interface 900 is comprised of a presentation support area 910; a speech area 920; and a note area 930. In one of the various exemplary embodiments according to this invention, the presentation support area 910 is comprised of discrete first, second and third portions 911-913. The first, second and third portions 911-913 of the presentation support area 910 are associated with time intervals $t_1$, $t_2$ and $t_3$. The information contained within the first, second and third portions 911-913 of the presentation support area 910 reflect the presentation support materials displayed during the class or seminar. Thus, if the speaker's support information is accessible in any form for which there exists a known or later developed process for conversion into machine readable form, the speaker's support information presented during the specified time interval is displayed in the presentation support area 910. It will be apparent that the representation of the support information could be the output of any known or later developed transformation of the support information. For example, a video shown in support of a lesson can be captured and presented to the user as represented by its most salient frame and/or a natural language description of the video scene depicted. It will also be apparent that the time intervals associated with the first, second and third portions 911-913 of the presentation support area 810 may be fixed or may vary in size without departing from the scope of this invention.

The speech area 920 of the exemplary collaborative note-taking user interface 900 is comprised of first, second and third portions 921-923. In one of the various exemplary embodiments according to this invention, information displayed in the first, second and third portions 921-923 of the speech area 920 reflect the salient tokens in the speech information. In still other exemplary embodiments according to this invention, alternate strings of salient tokens are ordered or ranked based on their probability of occurrence. The probabilities of occurrence may be based on confidence, correctness, relevancy and/or any other features.

The probability of the candidate salient tokens reflecting the actual information content of the speech information is determined based on the dynamically determined relatedness of the candidate salient tokens to relevant portions of the presentation information or any other external measure of ground truth as well as dynamic determinations of correctness. For example, the first portion 921 of the speech area 820 contains the first salient token information "We have observed the cross over applicability of techniques for determining DNA structure". The term "cross over" in the first salient token is displayed using a bold display attribute. It will be apparent that any type of display attribute may be used including but not limited to color, font, italics and the like. Moreover, volume, intensity and other display appropriate display attributes may be used with tactile displays, aural displays ad the like. The bold display attribute indicates the semantic link to the corresponding bolded area of the first portion 911 of the presentation area 910. Similarly, the term "determining DNA structure" and the term "cross over" in the speech area 920 are both also found in the presentation area 910. It will be apparent that metrics of relatedness are not limited to literal overlap but may be based on any measure of linguistic relatedness useful in determining a basis for the current domain.

The second portion 922 of the speech area 920 contains two candidate salient tokens. The term "structure" provides conceptual overlap that links the information in the second portion 912 of the presentation area 910 and the salient tokens in the second portion 922 of the speech area 920. The information in the speech area 920 is then ranked based on the relevancy, correctness and optional confidence scores to determine the overall rank of the salient tokens. The salient tokens may then be used as features to dynamically select and/or adjust the domain based language models. In still other exemplary embodiments, collaborative user actions are monitored to determine collaborative user feedback signals. Thus, if a majority of active users select the first candidate salient token, a positive collaborative user feedback signal is determined. The positive collaborative user feedback signal optionally reinforces the predictive model that correctly ranked the first salient toke as the most likely salient token to be selected. Negative collaborative user feedback signals may also be used. It will be apparent that the collaborative user feedback signal may also be used to further train and/or refine the domain prediction models.

The third portion 922 of the speech area 920 contains the phrase "Please be sure to stop by our booth after the meeting to sign up for this years July 15 Aspen conference." The "July 15$^{th}$" and "Aspen" terms literally overlap with the information in the third portion 913 of the presentation area 910. The term "this years" is displayed with an underline display characteristic to indicate the semantic relatedness that exists between the term "2004" and the phrase "this years".

The first candidate salient token in the third portion 923 of the speech area 920 is shaded. This indicates that the candidate phrase has been selected by a user as a collaborative note. The transformation selectors 941-943 are associated with additional optional operations that can be applied to the selected candidate phrase to generate a collaborative note. Thus, the grammatical summary selector 941 determines a grammatical summary of any selected text. Similarly, the hybrid selector 942 and the keyword selector 943 produce hybrid and keyword summaries of the selected text. It will be apparent that any known or later developed linguistic transformation useful in generating a collaborative note may also be used in the practice of this invention. The actions of users with respect to information displayed in the speech area 920 provide collaborative user feedback signals to the collaborative note-taking system. The collaborative user feedback signals are optionally used to train and/or adapt the domain based language models.

The notes portion 930 of the exemplary collaborative note taking user interface 900 contains a copy of the suggested salient token 951. A grammatical summary 952 of the salient token 951 is also shown. The underlined portions of the salient token 951 indicate the portions omitted in the grammatical summary 952. The italicized portion "after the meeting" in the suggested salient token 951 has been transformed to "later" in the grammatical summary 952.

The politeness portion "please be sure to" has also been omitted. The relative temporal indicator "this years July $15^{th}$" has been transformed into the absolute date "Jul. 15, 2004". This helps ensure readability if the notes are archived and consulted in later years. Finally, the term "conference" has been transformed into the abbreviation "conf". It will be apparent that abbreviations may be based on specific fields of study, groups of users, individual users or any other known or later developed grouping.

Figure 8:
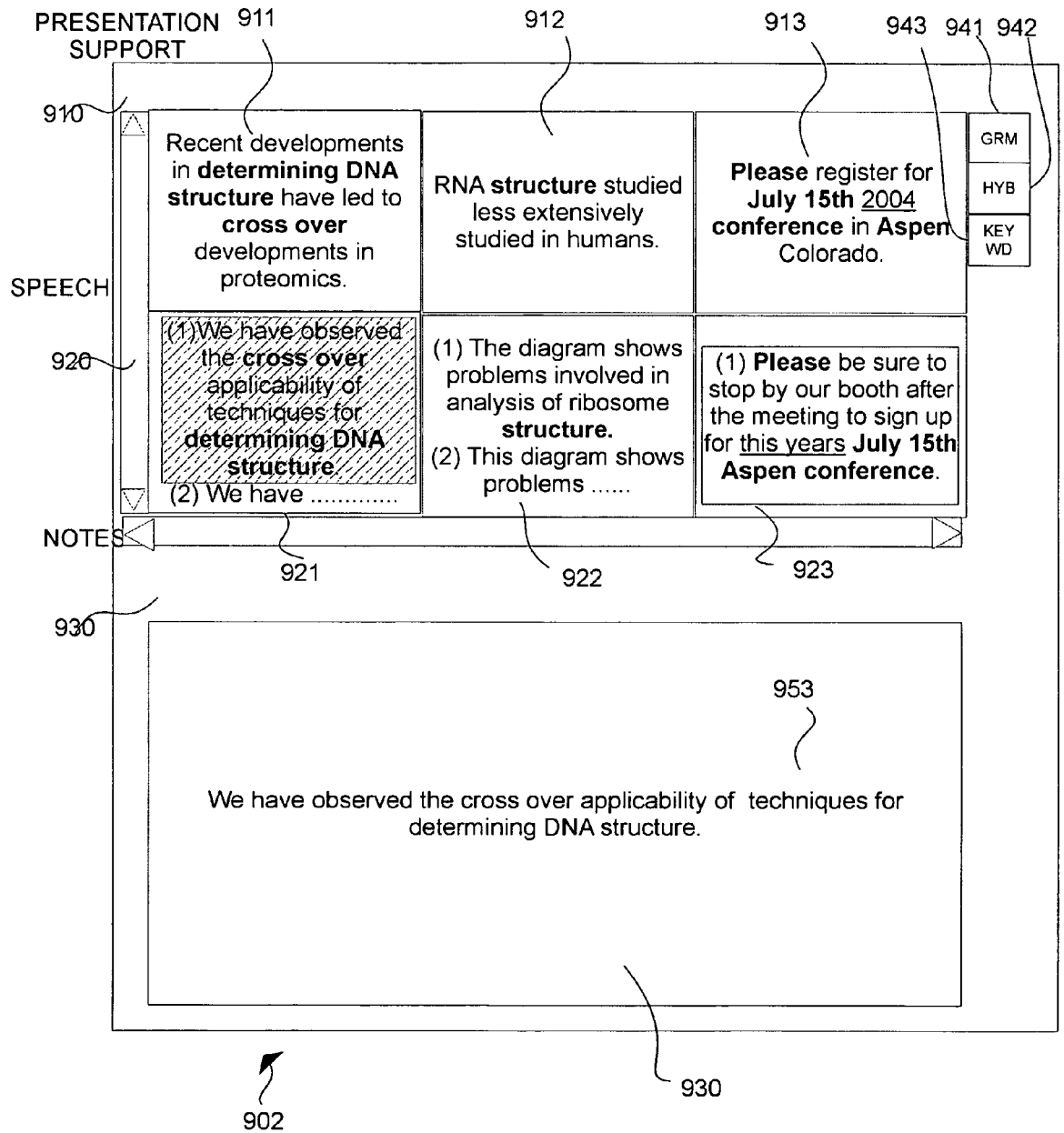
FIG. 8 shows a second aspect of the exemplary collaborative note-taking user interface according to this invention.

FIG. 8 shows a second aspect of the exemplary collaborative note-taking user interface 900 according to this invention. The user has highlighted information in the first portion 921 of the speech area 920. The first portion 921 of the speech area is associated with time $t_1$. However, the current time is at least $t_3$ since a third portion of the presentation and speech area is displayed. The positive or negative actions of the user are still available to generate collaborative user feedback signals, with respect to the earlier salient tokens and presentation support information, even at the later time $t_3$, since the collaborative user note-taking interface preserves the context for each stream of relevant information in a temporal map.

FIG. 9 is a first exemplary data structure for storing presentation style information according to one aspect of this invention. The exemplary data structure for storing presentation style information 1000 is comprised of a speaker identifier portion 1010, a presentation style portion 1020 and an optional description portion 1030.

The speaker identifier portion 1010 uniquely identifies a speaker to the collaborative note-taking system. The presentation style identifier portion 1020 specifies the speaker's typical flow through the presentation information. The description portion 1030 describes the determined typical flow. The exemplary presentation style may be determined based on an analysis of a labeled training corpus of speaker identified presentation materials.

The first row of the exemplary data structure for storing presentation style information contains the value "11" in the speaker identifier portion 1010. This value uniquely identifies the speaker to the system. The presentation style portion 1020 contains the value "1" and the value "OUTSIDE-IN" in the description portion 1030. These values indicate that speaker "11" is associated with a presentation style that starts at the outside and works inwardly.

The second row contains the value "13" in the speaker identifier portion 1010. The value "2" in the presentation style portion 1030 and the value "INSIDE-OUT" in the description portion 1030 indicate that speaker "13" is associated with a type "2" presentation style. The type "2" presentation style starts with detailed presentation material on the inside of the speaking notes and works toward more general points.

The third row contains the value "25" in the speaker identifier portion 1010. The value "2" in the presentation style portion 1030 and the value "INSIDE-OUT" in the description portion 1030 indicate that speaker "25" is associated with a type "2" presentation style. As discussed above, type "2" presentation styles start with the detailed presentation material on the inside of the speaking notes and works toward more general points.

The fourth row contains the value "30" in the speaker identifier portion 1010. The value "1" in the presentation style portion 1030 and the value "OUTSIDE-OUT" in the description portion 1030 indicate that speaker "30" is associated with a type "1" presentation style. The type "1" presentation style starts at the outside of the speaking notes or support material and tends to works inwardly.

FIG. 10 is a second exemplary data structure for storing presentation style information according to another aspect of this invention. The second exemplary data structure for storing presentation style information 1100 is comprised of the speaker identifier portion 1010, a written presentation style portion 1110, and a verbal presentation style portion 1120.

The speaker identifier portion 1010 contains an identifier that uniquely identifies the speaker. The written presentation style portion 1010 contains information describing the speaker's typical or predicted flow through presentation support materials of this type. Thus, for example, the written presentation support materials may include the presentation slides, speaker's notes and/or any other machine readable support information useful in identifying domain information.

The verbal presentation style portion 1120 contains information describing the style of verbal presentation the speaker is likely to use in presenting the class. Thus, different verbal presentation styles may be associated with different written presentation styles for the same speaker. For example, a verbal presentation style of "headings" is associated with the written presentation style of "expository 1". This indicates that if the presentation support materials are determined to be of type "expository 1", then the speaker is likely to present them in the style identified as "headings". It will be apparent that the written and verbal presentation styles can be identified based on the classification of differences and/or similarities in structural representations of discourse associated with the written and verbal material. Thus, a theory of discourse analysis is used to characterize the flow through the presentation support materials and the actual flow through the verbal presentation. Features are determined and a predictive model determined that predicts the next portion of the presentation materials likely to be discussed based on the speakers current location in the written presentation.

That is, a model is determined that predicts which points within the presentation materials the speaker is likely to present next. The predictive model is then used to dynamically identify salient words indicative of the current domain and/or subdomain in the presentation. The determination of the relevancy between the recognized speech and the identified domain is used to dynamically determine and/or adjust the associated domain based language models.

Figure 11:
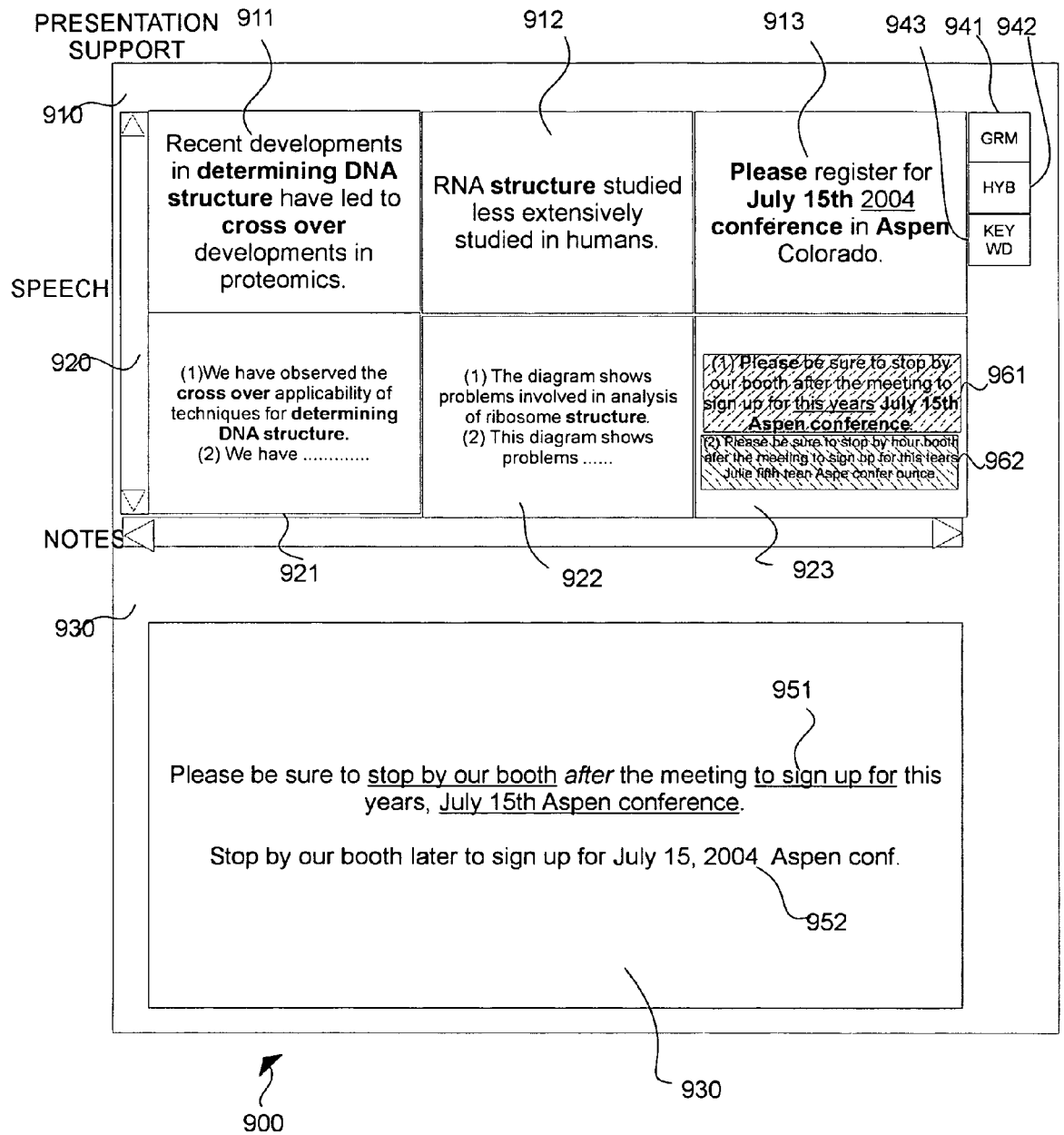
FIG. 11 shows a second exemplary embodiment of a collaborative user interface according to this invention.

FIG. 11 shows a second exemplary embodiment of a collaborative note-taking user interface according to this invention. The third portion 923 of the speech portion 920 contains first and second candidate tokens. The first candidate token is associated with a first selection area 961. In one of the exemplary embodiments according to this invention, the first selection area 961 is sized based on relevance, correctness and/or confidence scores associated with the first candidate token.

The second candidate token is displayed with a second dynamically determined selection area 962. A second selection area 962 is associated with the second candidate token and is based on the relevance, correctness and/or confidence scores corresponding to the second candidate token. Thus, the second selection area 962 differs in size from the first selection area 961. The larger size of the first selection area 961 increases the likelihood that the user will select candidate tokens associated with higher relevance, correctness and/or confidence scores.

Figure 12:
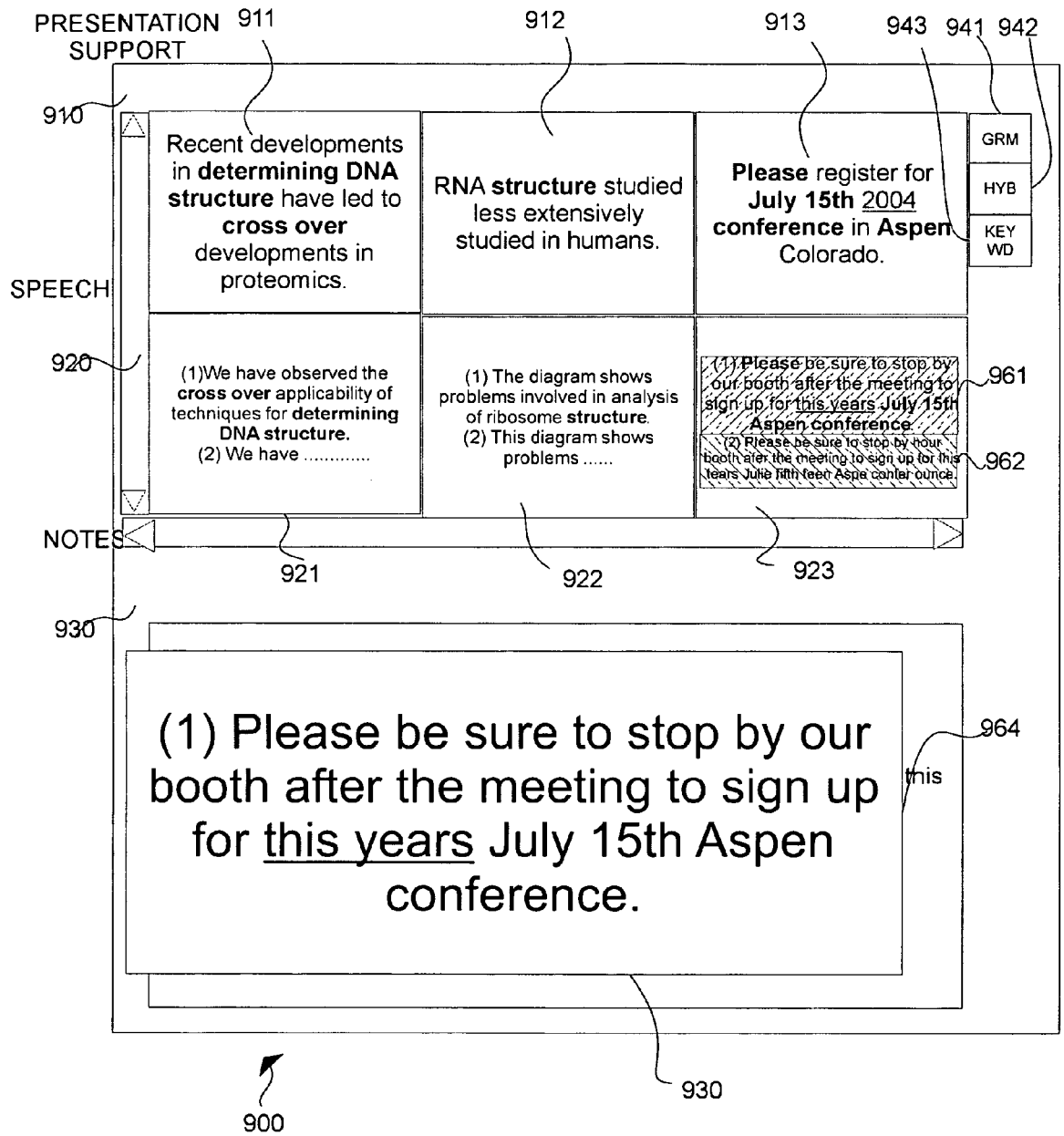
FIG. 12 shows a second exemplary embodiment of a collaborative note-taking user interface according to this invention.

FIG. 12 shows a second exemplary embodiment of a collaborative note-taking user interface according to this invention. The first candidate token is displayed in a transiently zoomed or enlarged display area 964. The transiently zoomed display 964 facilitates user selection of more likely correct, and/or relevant candidate tokens. In various embodiments according to this invention, the transiently zoomed display area 964 is displayed for a few seconds. However, in other embodiments, a zoom selection mode or any other method of switching modes is used to switch between the transiently zoomed display and a normal display.

Each of the circuits 10-60 of the collaborative note-taking system 100 described in FIG. 3 can be implemented as portions of a suitably programmed general-purpose computer. Alternatively, the collaborative note-taking system 100 outlined above can be implemented as physically distinct hardware circuits within an ASIC, or using a FPGA, a PDL, a PLA or a PAL, or using discrete logic elements or discrete circuit elements. The particular form each of the circuits the collaborative note-taking system 100 outlined above will take is a design choice and will be obvious and predicable to those skilled in the art.

Moreover, the collaborative note-taking system 100 and/or each of the various circuits discussed above can each be implemented as software routines, managers or objects executing on a programmed general purpose computer, a special purpose computer, a microprocessor or the like. In this case, the collaborative note-taking system 100 and/or each of the various circuits discussed above can each be implemented as one or more routines embedded in the communications network, as a resource residing on a server, or the like. The collaborative note-taking system 100 and the various circuits discussed above can also be implemented by physically incorporating the collaborative note-taking system 100 into software and/or a hardware system, such as the hardware and software systems of a web server or a client device.

As shown in FIG. 3, memory 10 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 3 can each be any known or later developed device or system for connecting a communication device to the collaborative note-taking system 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for collaborative note taking based on a speech of a speaker and providing a summary to a user in an audience of the speaker, the method comprising:
  receiving a first set of information from the speech;
  performing speech recognition on the first set of information and determining selected portions of the speech;
  determining portions of context information corresponding to a domain information from a presentation information source temporally associated with the selected portions of the speech;
  determining at least one language model based on the selected portions of the speech and the temporally associated portions of context information from the presentation information source, wherein the at least one language model is dynamically determined;
  applying the language model to the first set of information to extract salient tokens from the first set of information;
  verifying relevance of the salient tokens based on the presentation information source to obtain verified tokens;
  generating the summary including the extracted salient tokens, wherein generating the summary includes assembling the verified tokens;
  displaying the summary to the user; and
  receiving collaborative user feedback information relating to the summary and adjusting the language model according to the collaborative user feedback,
  wherein the method is implemented by a computer.

2. The method of claim 1, wherein the language model recognizes at least one of: speech and handwriting information.

3. The method of claim 1, wherein the language model recognizes features associated with at least one of: audio information, video information, and tactile information.

4. The method of claim 1, wherein the language model recognizes attributes associated with at least one of: a song, a book and a video.

5. The method of claim 4, wherein the attributes are at least one of: a title, a genre, an author.

6. The method of claim 1, wherein the language model is a composite language model.

7. The method of claim 6, wherein the composite language model is comprised of at least one of an actor based model, a domain based model and a genre based model.

8. The method of claim 7, wherein the actor based model is a speaker based language model.

9. The method of claim 1, wherein the summary is a suggested note.

10. The method of claim 1, wherein the presentation information source is based on at least one of: audio, visual, tactile information.

11. The method of claim 10, wherein the audio information is collaborative user generated audio.

12. The method of claim 10, wherein the visual information is at least one of video information, video capture of user gestures, textual information.

13. The method of claim 1, wherein the collaborative user feedback is based on user actions.

14. The method of claim 13, wherein the user actions operate on at least one of: suggested collaborative notes, user notes, user corrections, user pauses.

15. The method of claim 13, wherein a user action is ignoring a suggested note.

16. The method of claim 13, wherein the collaborative user feedback is based on at least one of: numbers of user actions, identity of users taking action, weighting based on which users take action.

17. The method of claim 10, wherein the tactile information is displayed using a dynamically refreshable tactile display.

18. The method of claim 16, wherein the at least one composite language model is determined dynamically.

19. The method of claim 1, wherein the collaborative feedback information is determined based on at least one of: intensity of user response, number of users responding, type of responses, time to respond, identity of user responding.

20. A system for collaborative note taking based on a speech by a speaker and providing a summary to a user in an audience of the speaker, the system comprising:
a memory;
an input/output circuit for:
receiving a set of information from the speech;
retrieving portions of information from the set of information; and
retrieving portions of context information from a presentation information source to obtain domain information, the portions of information from the speech being temporally associated with the portions of context information from the presentation information source;
a processor that performs the operations:
determines at least one language model based on the portions of information from the speech and the temporally associated portion of context information from the presentation information source, wherein the at least one language model is dynamically determined;
applies the language model to the set of information to extract salient tokens from the set of information;
generates the summary;
transmits the summary to be displayed to the user; and
adjusts the language model according to the user feedback after receiving collaborative user feedback information relating to the summary; and
a relevance and correctness determination circuit for verifying relevance of the salient tokens based on support information to obtain verified tokens,
wherein the summary is generated by assembling the verified tokens.

21. The system of claim 20, wherein the summary is transmitted to a device of the user.

22. The system of claim 21, wherein the language model recognizes at least one of speech and handwriting information.

23. The system of claim 21, wherein the language model recognizes features associated with at least one of:
audio information, video information, and tactile information.

24. The system of claim 21, wherein the language model recognizes attributes associated with at least one of: a song, a book and a video.

25. The system of claim 24, wherein the attributes are at least one of: a title, a genre, an author.

26. The system of claim 21, wherein the context information is at least one of support information and collaborative user feedback information.

27. The system of claim 21, wherein the language model is a composite language model.

28. The system of claim 27, wherein the composite language model is comprised of at least one of an actor based model, a domain based model and a genre based model.

29. The system of claim 21, wherein the actor based model is a speaker based recognition model.

30. The system of claim 21, wherein the summary is a suggested note.

31. The system of claim 26, wherein the presentation information source is based on at least one of: audio, visual, tactile information.

32. The system of claim 31, wherein the audio information is collaborative user generated audio.

33. The system of claim 31, wherein the visual information is at least one of video information, video capture of user gestures, textual information.

34. The system of claim 26, wherein the collaborative user feedback is based on user actions.

35. The system of claim 34, wherein the user actions operate on at least one of: suggested collaborative notes, user notes, user corrections, user pauses.

36. The system of claim 34, wherein a user action is ignoring a suggested note.

37. The system of claim 34, wherein the collaborative user feedback is based on at least one of: numbers of user actions, identity of users taking action, weighting based on which users take action.

38. The system of claim 31, wherein the tactile information is displayed using a dynamically refreshable tactile display.

39. The system of claim 26, wherein the collaborative feedback information is determined based on at least one of: intensity of user response, number of users responding, type of responses, time to respond, identity of user responding.

40. Computer readable storage medium comprising computer readable program code embodied on the computer readable storage medium, the computer readable program code usable to program a computer to recognize ambiguous information comprising:
determining portions of information from a speech of a speaker;
determining portions of context information from a presentation information source temporally associated with the portions of information from the speech;
determining at least one language model based on the portions of information from the speech and the temporally associated portions of context information from the presentation information source, wherein the at least one language model is dynamically determined;
applying the at least one language model to the speech to extract salient tokens from the speech;
verifying relevance of the salient tokens based on the presentation information source to obtain verified tokens;
determining a summary of the speech based on at least one of the determined language models, wherein determining the summary includes assembling the verified tokens;
displaying the summary to a user in an audience; and
receiving collaborative user feedback information relating to the summary and adjusting the language model according to the collaborative user feedback.

41. The computer readable storage medium of claim 40, wherein the computer readable program codes is usable to program the computer to recognize ambiguous information.

42. A system for recognizing information from a speaker and providing a summary for a user in an audience of the speaker, comprising:

means for determining portions of information from a speech of he speaker means for determining portions of context information from a presentation information source temporally associated with the portions of information from the speech, and determining domain information of the speech from the context information;

means for determining at least one language model based on the portions of information from the speech and the temporally associated portions of context information from the presentation information source, wherein the at least one language model is dynamically determined;

means for determining output information based on at least one of the determined language models, said means for determining output applying the language model to the speech to extract salient tokens from the speech, verifying relevance of the salient tokens based on the presentation information source to obtain verified tokens, and generating a summary of the speech by assembling the verified tokens;

means for displaying the summary to the user; and means for receiving collaborative user feedback information relating to the summary and adjusting the language model according to the collaborative user feedback.

43. The method of claim 8, further comprising determining matching verbalization of acronyms in the speech with a tokenized representation of the acronym in the presentation information source.

44. The method of claim 8, further comprising determining matching verbalization of acronyms in the presentation information source with a tokenized representation of the acronym in the speech.

45. The system of claim 29, wherein the processor further determines matching verbalization of acronyms in the speech with a tokenized representation of the acronym in the presentation information source.

46. The system of claim 29, wherein the processor further determines matching verbalization of acronyms in the presentation information source with a tokenized representation of the acronym in the speech.

\* \* \* \* \*